(12) United States Patent
Chen et al.

(10) Patent No.: US 10,310,668 B2
(45) Date of Patent: Jun. 4, 2019

(54) TOUCH SCREEN DISPLAY SYSTEM AND A METHOD FOR CONTROLLING A TOUCH SCREEN DISPLAY SYSTEM

(71) Applicant: Coretronic Corporation, Hsin-Chu (TW)

(72) Inventors: Yung-Chih Chen, Hsin-Chu (TW); Je-Fu Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 417 days.

(21) Appl. No.: 14/997,588

(22) Filed: Jan. 18, 2016

(65) Prior Publication Data

US 2017/0205952 A1    Jul. 20, 2017

(51) Int. Cl.
*G06F 3/041* (2006.01)
*G06F 3/042* (2006.01)

(52) U.S. Cl.
CPC .......... *G06F 3/0418* (2013.01); *G06F 3/0425* (2013.01); *G06F 2203/04104* (2013.01)

(58) Field of Classification Search
CPC . G06F 3/033; G06F 3/02; G06F 3/041; G06F 3/045; G09G 5/08; G09G 5/00; G01R 27/26
See application file for complete search history.

(56) References Cited

U.S. PATENT DOCUMENTS

| 8,711,225 B2 | 4/2014 | Chang et al. | |
|---|---|---|---|
| 2004/0085256 A1* | 5/2004 | Hereld | H04N 9/12 345/1.1 |
| 2011/0050640 A1 | 3/2011 | Lundback et al. | |
| 2012/0069155 A1* | 3/2012 | Shim | H04N 13/0048 348/51 |
| 2012/0113057 A1* | 5/2012 | Kobayashi | G06F 3/0421 345/175 |
| 2012/0299845 A1* | 11/2012 | Seo | G06F 1/1641 345/173 |
| 2014/0101579 A1* | 4/2014 | Kim | G06F 3/0486 715/761 |
| 2014/0184539 A1* | 7/2014 | Shin | G06F 3/0412 345/173 |
| 2014/0184628 A1* | 7/2014 | Lee | G06F 3/1423 345/545 |
| 2016/0165229 A1* | 6/2016 | Kao | H04N 17/04 348/189 |

FOREIGN PATENT DOCUMENTS

CN    202257528    5/2012

* cited by examiner

*Primary Examiner* — Pegeman Karimi
(74) *Attorney, Agent, or Firm* — JCIPRNET

(57) ABSTRACT

A touch screen display system including at least two touch screen display apparatuses and a host apparatus is provided. The two touch screen display apparatuses respectively include a first touch screen and a second touch screen. One touch screen display apparatus senses the first touch screen in a first time period. Another touch screen display apparatus senses the second touch screen in a second time period. The host apparatus is electrically connected to the two touch screen display apparatuses. The host apparatus determines a touch location of a first touch object on the first touch screen or a touch location of a second touch object on the second touch screen. In addition, a method for controlling a touch screen display system is also provided.

21 Claims, 5 Drawing Sheets

TOUCH SCREEN DISPLAY SYSTEM AND A METHOD FOR CONTROLLING A TOUCH SCREEN DISPLAY SYSTEM

BACKGROUND OF THE INVENTION

1. Field of the Invention

The invention generally relates to a display system and a method for controlling a display system, in particular, to a touch screen display system and a method for controlling a touch screen display system.

2. Description of Related Art

In conventional projection technology, a host apparatus may project image frames on a single screen via a projection apparatus. For touch sensing application, the projection apparatus may be equipped with a sensing light source and an image capturing apparatus. A light curtain is generated in front of the single screen by using the light source. When a touch object touches to the light curtain, light beams of the light curtain are divergently reflected by the touch object. The image capturing apparatus captures the image frames displayed on the single screen, and transmits the captured image data to the host apparatus. The host apparatus determines a touch location of the touch object on the single screen according to the captured image data. For multiple screens application, a method for controlling a touch screen display system having at least two touch screen display apparatuses is necessary. How to design a touch screen display system that has satisfactory operation quality without increasing the manufacturing costs is one of the most important topics in the pertinent field.

The information disclosed in this "Description of Related Art" section is only for enhancement of understanding of the background of the invention and therefore it may contain information that does not form the prior art that is already known to a person of ordinary skill in the art. Furthermore, the information disclosed in this "Description of Related Art" section does not mean that one or more problems to be resolved by one or more embodiments of the invention were acknowledged by a person of ordinary skill in the art.

SUMMARY OF THE INVENTION

The invention is directed to a touch screen display system and a method for controlling the touch screen display system, capable of providing touch sensing functions for at least two touch screen display apparatuses.

Other objects and advantages of the invention can be further illustrated by the technical features broadly embodied and described as follows.

In order to achieve one or a portion of or all of the objects or other objects, an embodiment of the invention provides a touch screen display system including at least two touch screen display apparatuses and a host apparatus. The at least two touch screen display apparatuses respectively include a first touch screen and a second touch screen. One of the at least two touch screen display apparatuses senses the first touch screen in a first time period. Another one of the at least two touch screen display apparatuses senses the second touch screen in a second time period. The host apparatus is electrically connected to the at least two touch screen display apparatuses. The host apparatus is adapted to determine a touch location of a first touch object on the first touch screen and/or a touch location of a second touch object on the second touch screen.

In an embodiment of the invention, the host apparatus controls the at least two touch screen display apparatuses to respectively display a main frame of an operating system and an extending frame of the operating system on the first touch screen and the second touch screen.

In an embodiment of the invention, the host apparatus further controls the at least two touch screen display apparatuses to respectively display a plurality of test patterns on the first touch screen and the second touch screen for touch screen calibration in a manner of time division. The test patterns include a first pair of test patterns and a second pair of test patterns. The first pair of test patterns has a gray scale compensation property, and the second pair of test patterns has a position compensation property.

In an embodiment of the invention, the first pair of test patterns includes a first test pattern and a second test pattern. The first test pattern includes a background of a first gray scale and a plurality of marks of a second gray scale. The second test pattern includes a background of the second gray scale and a plurality of marks of the first gray scale. A summation value of the first gray scale and the second gray scale is a maximum gray value.

In an embodiment of the invention, locations of the marks of the second gray scale on the first test pattern are corresponding to locations of the marks of the first gray scale on the second test pattern.

In an embodiment of the invention, the second pair of test patterns includes a third test pattern and a fourth test pattern. The third test pattern includes a plurality of first marks, and the fourth test pattern includes a plurality of second marks. A combination of the first marks and the second marks are arranged in an array.

In an embodiment of the invention, the combination of the first marks and the second marks uniformly distributes in an area that a size is equal to a size of the third test pattern or the fourth test pattern.

In an embodiment of the invention, the test patterns further include a test pattern having no mark. The host apparatus controls the at least two touch screen display apparatuses to respectively display the test patterns on the first touch screen and the second touch screen for touch screen calibration in the manner of time division. The host apparatus controls the one of the at least two touch screen display apparatuses to sequentially display the test patterns on the first touch screen in a third time period. The host apparatus controls the another one of the at least two touch screen display apparatuses to display the test pattern having no mark on the second touch screen in the third time period.

In an embodiment of the invention, the host apparatus controls the at least two touch screen display apparatuses to respectively display the test patterns on the first touch screen and the second touch screen for touch screen calibration in the manner of time division. The host apparatus controls the one of the at least two touch screen display apparatuses to display the test pattern having no mark on the first touch screen in a fourth time period. The host apparatus controls the another one of the at least two touch screen display apparatuses to sequentially display the test patterns on the second touch screen in the fourth time period.

In order to achieve one or a portion of or all of the objects or other objects, another embodiment of the invention provides a method for controlling a touch screen display system. The touch screen display system includes at least two touch screen display apparatuses respectively includes a first touch screen and a second touch screen. The method includes: controlling one of the at least two touch screen display apparatuses to sense the first touch screen in a first time period; controlling another one of the at least two touch screen display apparatuses to sense the second touch screen in a second time period; and determining a touch location of a first touch object on the first touch screen and/or a touch location of a second touch object on the second touch screen.

In an embodiment of the invention, the method for controlling the touch screen display system further includes controlling the at least two touch screen display apparatuses to respectively display a main frame of an operating system and an extending frame of the operating system on the first touch screen and the second touch screen.

In an embodiment of the invention, the method for controlling the touch screen display system further includes controlling the at least two touch screen display apparatuses to respectively display a plurality of test patterns on the first touch screen and the second touch screen for touch screen calibration in a manner of time division.

In an embodiment of the invention, the test patterns further include a test pattern having no mark. The step of controlling the at least two touch screen display apparatuses to respectively display the test patterns on the first touch screen and the second touch screen for touch screen calibration in the manner of time division includes: controlling the one of the at least two touch screen display apparatuses to sequentially display the test patterns on the first touch screen in a third time period; and controlling the another one of the at least two touch screen display apparatuses to display the test pattern having no mark on the second touch screen in the third time period.

In an embodiment of the invention, the step of controlling the at least two touch screen display apparatuses to respectively display the test patterns on the first touch screen and the second touch screen for touch screen calibration in the manner of time division further includes: controlling the one of the at least two touch screen display apparatuses to display the test pattern having no mark on the first touch screen in a fourth time period; and controlling the another one of the at least two touch screen display apparatuses to sequentially display the test patterns on the second touch screen in the fourth time period.

According to the above descriptions, the embodiment of the invention has at least one of the following advantages or effects. In exemplary embodiments, the host apparatus respectively controls the touch screen display apparatuses to sense the touch objects in the manner of time division. Accordingly, the touch screen display system and the method for controlling the touch screen display system are capable of providing touch sensing functions for at least two touch screen display apparatuses.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
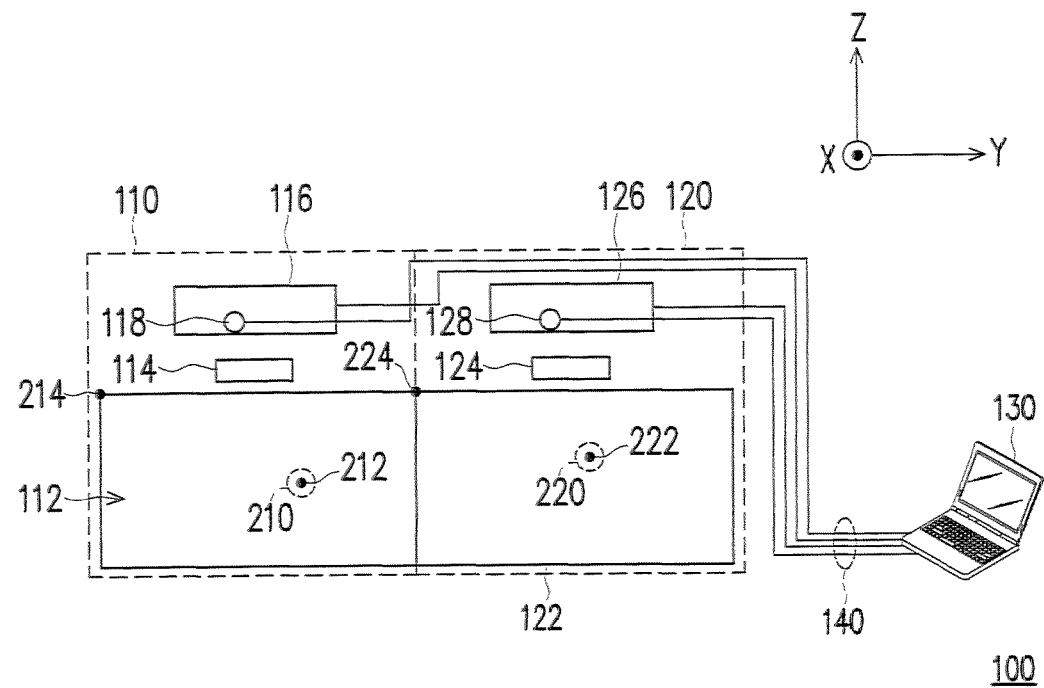
FIG. 1 illustrates a front view of a touch screen display system according to an embodiment of the invention.

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Reference will now be made in detail to the preferred embodiments of the invention, examples of which are illustrated in the accompanying drawings. Wherever possible, the same reference numbers are used in the drawings and the description to refer to the same or like parts.

Figure 2:
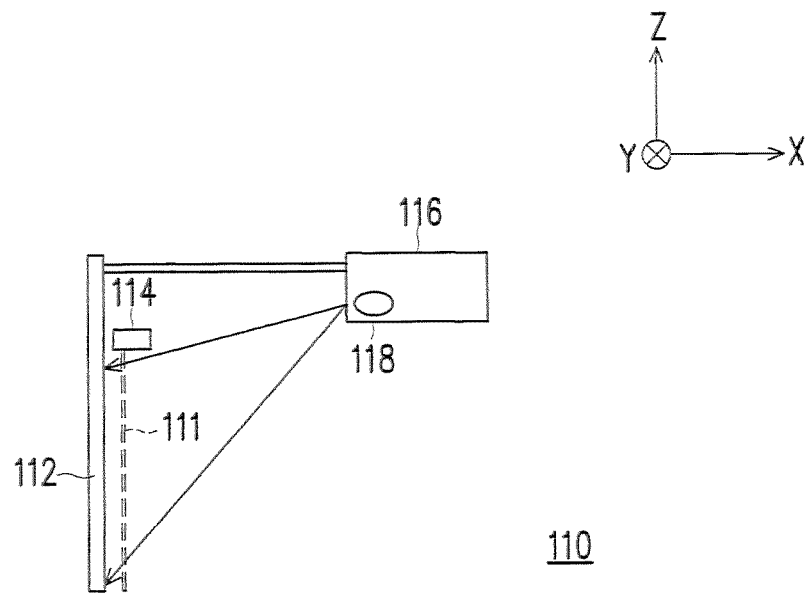
FIG. 2 illustrates a side view of a touch screen display apparatus according to an embodiment of the invention.

FIG. 1 illustrates a front view of a touch screen display system according to an embodiment of the invention. FIG. 2 illustrates a side view of a touch screen display apparatus according to an embodiment of the invention. Referring to FIG. 1 and FIG. 2, a touch screen display system 100 of the embodiment includes at least two touch screen display apparatuses 110 and 120 and a host apparatus 130. The host apparatus 130 is electrically connected to the at least two touch screen display apparatuses 110 and 120 via signal transmission cables 140, such as USB cables, VGA cables or HDMI cables, but the invention is not limited thereto. In one embodiment, the host apparatus 130 may be electrically connected to the at least two touch screen display apparatuses 110 and 120 via a wireless transmission technology, WiFi or Bluetooth, for example.

In the embodiment, the host apparatus 130 is, for example, a portable electronic device, a non-portable electronic device, a wearable electronic device, or a non-wearable electronic device, etc., which is not limited in the invention. In the embodiment, two touch screen display apparatuses are exemplarily disclosed for description, but the invention is not limited thereto. In one embodiment, the touch screen display system 100 may include three or more touch screen display apparatuses.

To be specific, each of the touch screen display apparatuses includes a touch screen, a light source, a projection apparatus and an image capturing apparatus in the embodiment. Taking the first touch screen display apparatus 110 for example, the first touch screen display apparatus 110 may include a touch screen 112, a light source 114, a projection apparatus 116 and an image capturing apparatus 118. FIG. 2 illustrates the side view of the first touch screen display apparatus 100, for example. The elements that the second touch screen display apparatus 120 includes and the side view thereof may be deduced by analogy according to the first touch screen display apparatus 110, and it is not further described herein. In the embodiment, the image capturing apparatuses 118 and 128 may be cameras or other similar apparatuses, and the invention is not limited thereto.

In the embodiment, the host apparatus 130 controls the projection apparatus 116 to display a main frame on the first touch screen 112. In the meanwhile, the host apparatus 130 also controls the projection apparatus 126 to display an extending frame on the second touch screen 122. In the embodiment, a combination of the main frame and the extending frame may be a whole frame or spatially continuous frames displayed or to be displayed on the host apparatus 130.

For a touch sensing operation, the light sources 114 and 124 may emit light beams, such as laser beams, to respectively form a light curtain in front of the touch screens 112 and 122. For example, a light curtain 111 is formed in front of the touch screen 112 as shown in FIG. 2. A light curtain formed in front of the touch screen 122 may be deduced by analogy according to FIG. 2, and it is not further described herein. When a touch object touches to the touch screens 112 or 122, the light beam is reflected to the image capturing apparatuses 118 or 128 from the light curtain by the touch object. In the embodiment, the host apparatus 130 controls the image capturing apparatus 118 to sense a first touch object 210 on the first touch screen 112 in a first time period, and controls the image capturing apparatus 128 to sense a second touch object 220 on the second touch screen 122 in a second time period. In the other embodiment, the image capturing apparatus 118 may not sense the first touch object 210 on the first touch screen 112 in a first time period, and the image capturing apparatus 128 may sense second touch object 220 on the second touch screen 122 in a second time period. The invention is not limited. Additionally, that is to say, the host apparatus 130 respectively controls the image capturing apparatuses 118 and 128 to sense the first touch object 210 and/or the second touch object 220 in a manner of time division in the embodiment. In the embodiment, the first touch object 210 and the second touch object 220 may be stylus pens, fingers or gestures, and the invention is not limited thereto.

In the embodiment, the host apparatus 130 determines a touch location 212 of the first touch object 210 on the first touch screen 112 and/or a touch location 222 of the second touch object 220 on the second touch screen 122. For example, the coordinates of points 214 and 224 in a main frame and an extending frame may be preset as default values in the host apparatus 130. The host apparatus 130 determines the touch location 212 of the first touch object 210 according to the coordinate of the point 214 of the main frame in the first time period, and then determines the touch location 222 of the second touch object 220 according to the coordinate of the point 224 of the extending frame in the second time period. Next, the host apparatus 130 modifies the touch location 222 of the second touch object 220 based on the touch location 212 of the first touch object 210 and the relationship between the coordinates of points 214 and 224 in the second time period. For example, the coordinate of point 214 of the main frame is (0,0) and the coordinate of point 224 of the extending frame is (1024, 0), the host apparatus 130 modifies the coordinated of touch location 222 of the second touch object 220 from the coordinate of point 214 of the main frame is (0,0). Therefore, the touch location 212 of the first touch object 210 and the touch location 222 of the second touch object 220 are determined, respectively.

Figure 3:
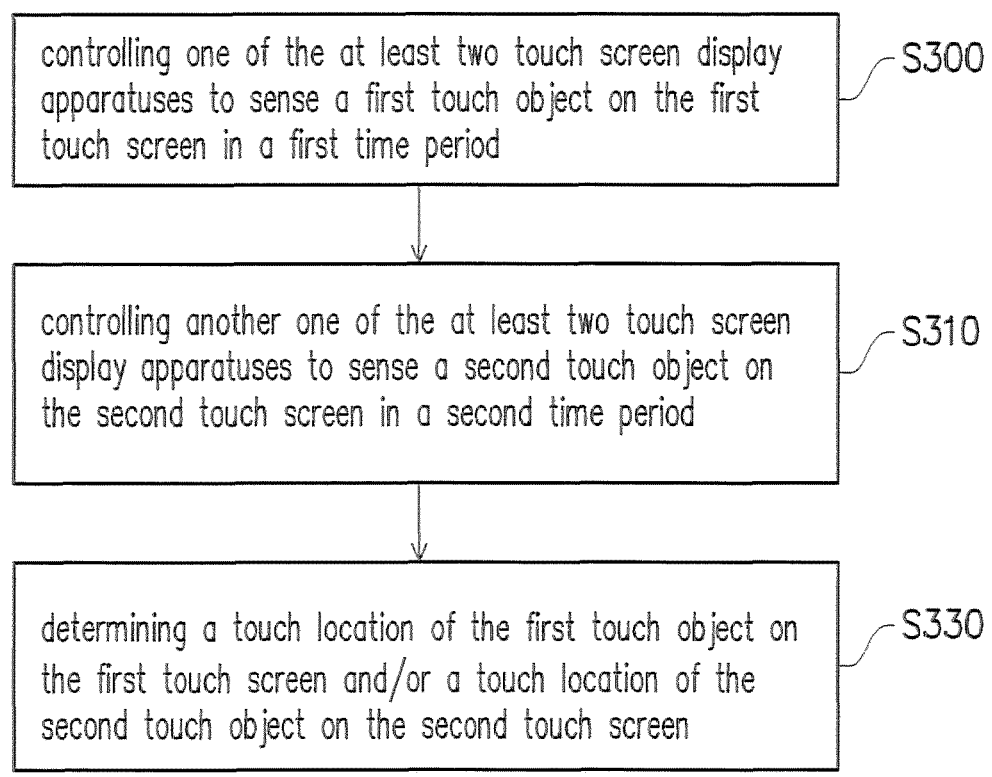
FIG. 3 is a flowchart of a method for controlling a touch screen display system according to an embodiment of the invention.

FIG. 3 is a flowchart of a method for controlling a touch screen display system according to an embodiment of the invention. With reference to FIG. 1 and FIG. 3, the method for controlling the touch screen display system as provided herein is at least applicable to the touch screen display system 100 depicted in FIG. 1, for instance. In the embodiment, the touch screen display system 100 depicted in FIG. 1 is taken for example; in step S300, the host apparatus 130 controls one of the at least two touch screen display apparatuses, such as the first screen display apparatus 110, to sense the first touch object 210 on the first touch screen 112 in the first time period. In step S310, the host apparatus 130 controls another one of the at least two touch screen display apparatuses, such as the second screen display apparatus 120, to sense the second touch object 220 on the second touch screen 122 in the second time period. However, the first time period and the second time period may be the same time interval or different. In step S330, the host apparatus 130 determines the touch location 212 of the first touch object 210 on the first touch screen 112 and/or the touch location 222 of the second touch object 220 on the second touch screen 122.

Besides, the method for controlling the touch screen display system described in this embodiment of the invention is sufficiently taught, suggested, and embodied in the embodiments illustrated in FIG. 1 to FIG. 2, and therefore no further description is provided herein.

In the embodiment, before the touch sensing operation, a touch screen calibration for location determination may be optionally performed. Description regarding how the touch screen calibration for location determination is performed according to test patterns is provided as follows.

Figure 4:
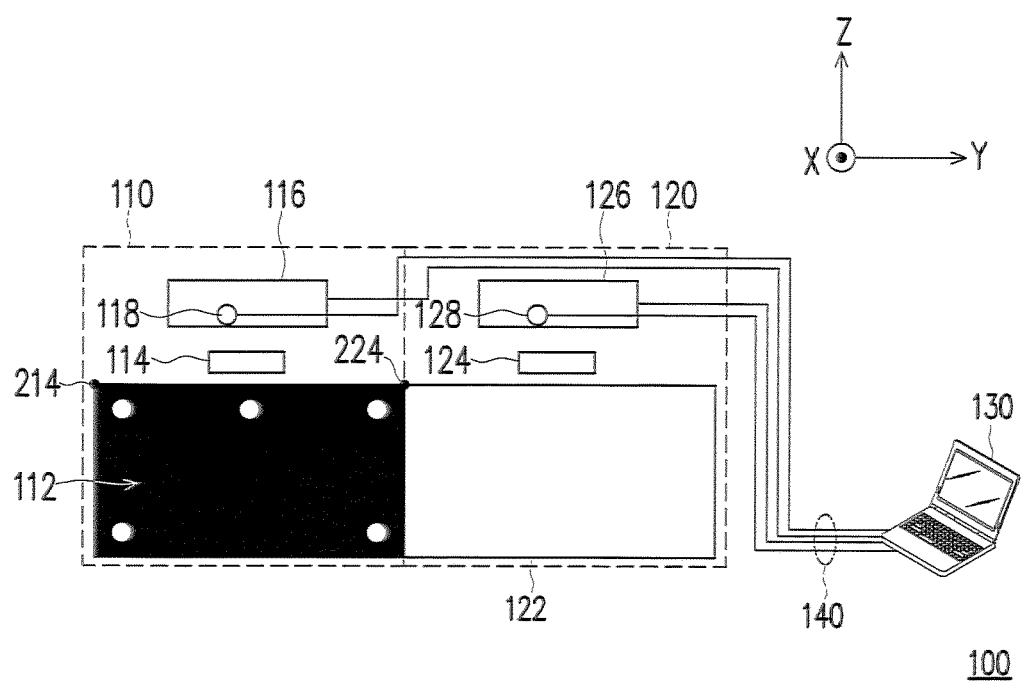
FIG. 4 illustrates the front view of the touch screen display system that test patterns are displayed according to an embodiment of the invention.
Figure 5:
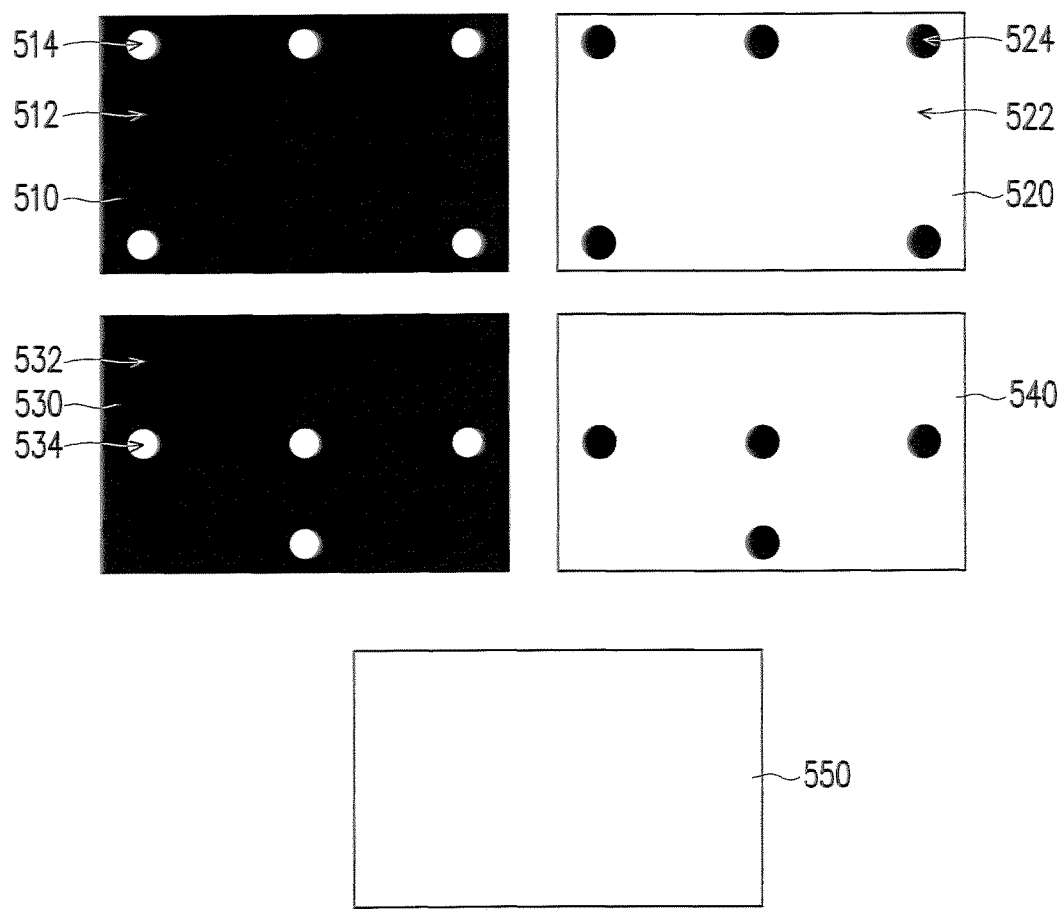
FIG. 5 illustrates a schematic diagram of test patterns according to an embodiment of the invention.

FIG. 4 illustrates the front view of the touch screen display system that test patterns are displayed according to an embodiment of the invention. FIG. 5 illustrates a schematic diagram of test patterns according to an embodiment of the invention. Referring to FIG. 4 and FIG. 5, the host apparatus 130 of the embodiment controls the first touch screen display apparatus 110 and the second touch screen display apparatus 120 to respectively display a plurality of test patterns 510 to 550 on the first touch screen 112 and the second touch screen 122 for touch screen calibration in a manner of time division. In the embodiment, after the touch screen calibration, the host apparatus 130 may provide a relatively accurate determination for touch locations.

To be specific, for calibrating the first touch screen 112, the host apparatus 130 controls the first touch screen display apparatus 110 to sequentially display the test patterns 510 to 540 on the first touch screen 112 in a third time period. The host apparatus 130 controls the second touch screen display apparatus 120 to display the test pattern 550, i.e. the test pattern 550 having no mark, on the second touch screen 122 in the third time period. Next, for calibrating the second touch screen 122, the host apparatus 130 controls the first touch screen display apparatus 110 to display the test pattern 550 on the first touch screen 112 in a fourth time period. The host apparatus 130 controls the second touch screen display apparatus 120 to sequentially display the test patterns 510 to 540 on the second touch screen 122 in the fourth time period. By using the test patterns 510 to 550 for touch screen calibration, the host apparatus 130 can provide relatively accurate touch locations. In the embodiment, the method for touch screen calibration may be implemented by using any adaptive algorithm or calibration method in the related art, which are not particularly limited in the invention. The host apparatus 130 may include a processor or adaptive circuit blocks to execute functional operations corresponding to the foregoing touch screen calibration. Enough teaching, suggestion, and implementation illustration for the foregoing touch screen calibration may be obtained with reference to common knowledge in the related art, which is not repeated hereinafter.

In the embodiment, the test pattern 510 includes a background 512 of a first gray scale and a plurality of marks 514 of a second gray scale. The test pattern 520 includes a background 522 of the second gray scale and a plurality of marks 524 of the first gray scale. The test patterns 510 and 520 form a first pair having a gray scale compensation property. A summation value of the first gray scale and the second gray scale is a maximum gray value, and locations of the marks 514 of the second gray scale on the test pattern 510 are corresponding to locations of the marks 524 of the first gray scale on the second test pattern 520. For example, the summation value of the first gray scale and the second gray scale may be the maximum gray value 255. If a value of the first gray scale is equal to the gray value 0, e.g. black, a value of the second gray scale is equal to the gray value 255, e.g. white. Therefore, the test pattern 510 includes the black background 512 and the white marks 514, and the test pattern 520 includes the white background 522 and the black marks 524 in the embodiment. The locations of the white marks 514 on the test pattern 510 are corresponding to the locations of the black marks 524 on the second test pattern 520. The test patterns 510 and 520 have the gray scale compensation property. In addition, the test patterns 530 and 540 also have the gray scale compensation property in the embodiment, and the relationship of the test patterns 530 and 540 can be deduced by analogy according to that of the test patterns 510 and 520, and it is not further described herein.

In the embodiment, the test pattern 530 includes a plurality of marks 534. The test patterns 510 and 530 form a second pair having a position compensation property. A combination of the marks 514 and 534 are arranged in an array. For example, the combination of the marks 514 and 534 uniformly distributes in an area that a size is equal to that of the test pattern 510 or 530, as shown in FIG. 5. The test patterns 510 and 530 have the position compensation property. In addition, the test patterns 520 and 540 also have the position compensation property in the embodiment, and the relationship of the test patterns 520 and 540 can be deduced by analogy according to that of the test patterns 510 and 530, and it is not further described herein.

Figure 6:
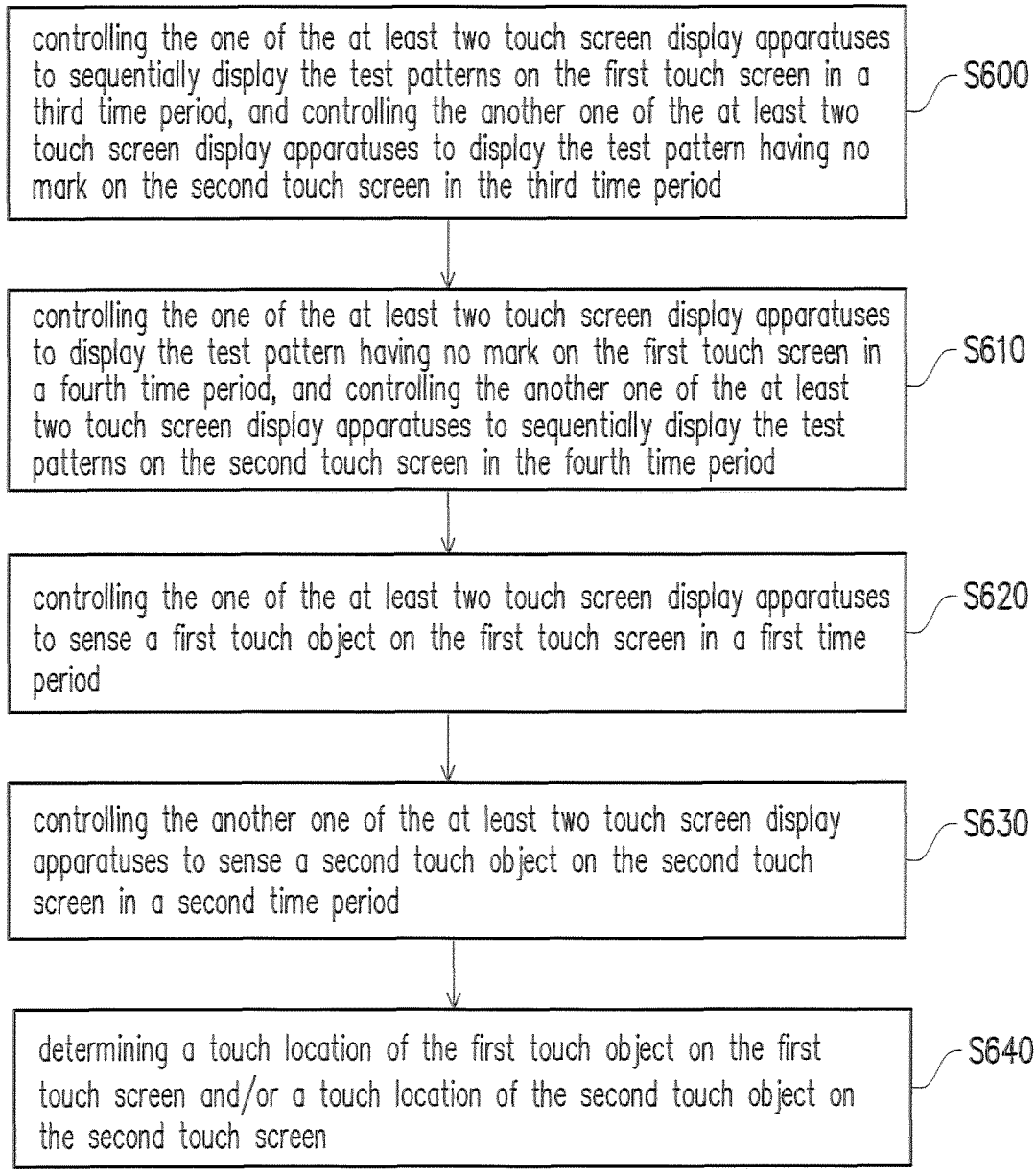
FIG. 6 is a flowchart of a method for controlling a touch screen display system according to another embodiment of the invention.

FIG. 6 is a flowchart of a method for controlling a touch screen display system according to another embodiment of the invention. With reference to FIG. 1 and FIG. 5, the method for controlling the touch screen display system as provided herein is at least applicable to the touch screen display system 100 depicted in FIG. 1, for instance. In the embodiment, the touch screen display system 100 depicted in FIG. 1 is taken for example; in step S600, the host apparatus 130 controls one of the at least two touch screen display apparatuses, such as the first screen display apparatus 110, to sequentially display the test patterns 510 to 540 on the first touch screen 112 in the third time period, and controls another one of the at least two touch screen display apparatuses, such as the second screen display apparatus 120, to display the test pattern 550 having no mark on the second touch screen 122 in the third time period. In step S610, the host apparatus 130 controls the one of the at least two touch screen display apparatuses to display the test pattern 550 having no mark on the first touch screen 112 in the fourth time period, and controls the another one of the at least two touch screen display apparatuses to sequentially display the test patterns 510 to 540 on the second touch screen 122 in the fourth time period. It should be noted that the steps S600 to S610 are not ordered when the method for controlling the touch screen display system is performed, the steps may be executed at the same time or at different time.

In step S620, the host apparatus 130 controls the one of the at least two touch screen display apparatuses to sense the first touch object 210 on the first touch screen 112 in the first time period. In step S630, the host apparatus 130 controls the another one of the at least two touch screen display apparatuses to sense the second touch object 220 on the second touch screen 122 in the second time period. In step S640, the host apparatus 130 determines the touch location 212 of the first touch object 210 on the first touch screen 112 and the touch location 222 of the second touch object 220 on the second touch screen 122.

Besides, the method for controlling the touch screen display system described in this embodiment of the invention is sufficiently taught, suggested, and embodied in the embodiments illustrated in FIG. 1 to FIG. 5, and therefore no further description is provided herein.

In summary, the host apparatus respectively controls the touch screen display apparatuses to sense the touch objects in the manner of time division in exemplary embodiments. The touch screen display system and the method for controlling the touch screen display system are capable of providing touch sensing functions for at least two touch screen display apparatuses. In addition, the touch screen calibration for location determination is optionally performed. The host apparatus provides a relatively accurate determination for touch locations after the touch screen calibration.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. These claims may refer to use "first", "second", etc. following with noun or element. Such terms should be understood as a nomenclature and should not be construed as giving the limitation on the number of the elements modified by such nomenclature unless specific number has been given. Moreover, no element and component in the present disclosure is intended to be dedicated to the public regardless of whether the element or component is explicitly recited in the following claims.

What is claimed is:

1. A touch screen display system, comprising:
at least two touch screen display apparatuses, respectively comprising a first touch screen and a second touch screen, wherein one of the at least two touch screen display apparatuses senses the first touch screen in a first time period, and another one of the at least two touch screen display apparatuses senses the second touch screen in a second time period; and
a host apparatus, electrically connected to the at least two touch screen display apparatuses, and adapted to determine a touch location of a first touch object on the first touch screen or a touch location of a second touch object on the second touch screen, wherein the at least two touch screen display apparatuses comprise a first image capturing apparatus and a second image capturing apparatus, the first image capturing apparatus senses the first touch object on the first touch screen in the first time period, the second image apparatus senses the second touch object on the second touch screen in the second time period,
wherein the host apparatus further controls the at least two touch screen display apparatuses to respectively display a plurality of test patterns on the first touch screen and the second touch screen for touch screen calibration in a manner of time division,
wherein the test patterns comprise at least a first pair of test patterns having a gray scale compensation property, using at least two gray scales including white and black.

2. The touch screen display system according to claim 1, wherein the host apparatus controls the at least two touch screen display apparatuses to respectively display a main frame of an operating system and an extending frame of the operating system on the first touch screen and the second touch screen.

3. The touch screen display system according to claim 1, wherein a second pair of test patterns having a position compensation property.

4. The touch screen display system according to claim 3, wherein the first pair of test patterns comprises a first test pattern and a second test pattern, the first test pattern comprises a background of a first gray scale and a plurality of marks of a second gray scale, and the second test pattern comprises a background of the second gray scale and a plurality of marks of the first gray scale, wherein a summation value of the first gray scale and the second gray scale is a maximum gray value.

5. The touch screen display system according to claim 4, wherein locations of the marks of the second gray scale on the first test pattern are corresponding to locations of the marks of the first gray scale on the second test pattern.

6. The touch screen display system according to claim 3, wherein the second pair of test patterns comprises a third test pattern and a fourth test pattern, the third test pattern comprises a plurality of first marks, and the fourth test pattern comprises a plurality of second marks, wherein a combination of the first marks and the second marks are arranged in an array.

7. The touch screen display system according to claim 6, wherein the combination of the first marks and the second marks uniformly distributes in an area that a size is equal to a size of the third test pattern or the fourth test pattern.

8. The touch screen display system according to claim 3, wherein the test patterns further comprise a test pattern having no mark, the host apparatus controls the one of the at least two touch screen display apparatuses to sequentially display the test patterns on the first touch screen in a third time period, and controls the another one of the at least two touch screen display apparatuses to display the test pattern having no mark on the second touch screen in the third time period.

9. The touch screen display system according to claim 8, wherein the host apparatus controls the one of the at least two touch screen display apparatuses to display the test pattern having no mark on the first touch screen in a fourth time period, and controls the another one of the at least two touch screen display apparatuses to sequentially display the test patterns on the second touch screen in the fourth time period.

10. The touch screen display system according to claim 1, wherein the at least two touch screen display apparatuses are physically separated from the host apparatus.

11. The touch screen display system according to claim 1, wherein the first touch screen is physically separated from the first image capturing apparatus, the second touch screen is physically separated from the second image capturing apparatus.

12. A method for controlling a touch screen display system, wherein the touch screen display system comprises at least two touch screen display apparatuses respectively comprising a first touch screen, a second touch screen, a first image capturing apparatus and a second image capturing apparatus, the method comprising:
controlling the first image capturing apparatus to sense a first touch object on the first touch screen in a first time period;
controlling the second image capturing apparatus to sense a second touch object on the second touch screen in a second time period;
determining a touch location of the first touch object on the first touch screen or a touch location of the second touch object on the second touch screen; and
controlling the at least two touch screen display apparatuses to respectively display a plurality of test patterns on the first touch screen and the second touch screen for touch screen calibration in a manner of time division,
wherein the test pattern comprise at least a first pair of test patterns having a gray scale compensation property, using at least two gray scales including whtie and black.

13. The method for controlling the touch screen display system according to claim 12, further comprising:
controlling the at least two touch screen display apparatuses to respectively display a main frame of an operating system and an extending frame of the operating system on the first touch screen and the second touch screen; and
controlling the at least two touch screen display apparatuses to respectively display a plurality of test patterns on the first touch screen and the second touch screen for touch screen calibration in a manner of time division,
wherein the test patterns comprise at least a first pair of test patterns having a gray scale compensation property, using at least two gray scales including white and black.

14. The method for controlling the touch screen display system according to claim 12, wherein a second pair of test patterns having a position compensation property.

15. The method for controlling the touch screen display system according to claim 14, wherein the first pair of test patterns comprises a first test pattern and a second test pattern, the first test pattern comprises a background of a first gray scale and a plurality of marks of a second gray scale, and the second test pattern comprises a background of the second gray scale and a plurality of marks of the first gray scale, wherein a summation value of the first gray scale and the second gray scale is a maximum gray value.

16. The method for controlling the touch screen display system according to claim 15, wherein locations of the marks of the second gray scale on the first test pattern are corresponding to locations of the marks of the first gray scale on the second test pattern.

17. The method for controlling the touch screen display system according to claim 14, wherein the second pair of test patterns comprises a third test pattern and a fourth test pattern, the third test pattern comprises a plurality of first marks, and the fourth test pattern comprises a plurality of second marks, wherein a combination of the first marks and the second marks are arranged in an array.

18. The method for controlling the touch screen display system according to claim 17, wherein the combination of the first marks and the second marks uniformly distributes in an area that a size is equal to a size of the third test pattern or the fourth test pattern.

19. The method for controlling the touch screen display system according to claim 14, wherein the test patterns further comprise a test pattern having no mark, and the step of controlling the at least two touch screen display apparatuses to respectively display the test patterns on the first touch screen and the second touch screen for touch screen calibration in the manner of time division comprises:

controlling the one of the at least two touch screen display apparatuses to sequentially display the test patterns on the first touch screen in a third time period; and controlling the another one of the at least two touch screen display apparatuses to display the test pattern having no mark on the second touch screen in the third time period.

20. The method for controlling the touch screen display system according to claim 19, wherein the step of controlling the at least two touch screen display apparatuses to respectively display the test patterns on the first touch screen and the second touch screen for touch screen calibration in the manner of time division further comprises:

controlling the one of the at least two touch screen display apparatuses to display the test pattern having no mark on the first touch screen in a fourth time period; and controlling the another one of the at least two touch screen display apparatuses to sequentially display the test patterns on the second touch screen in the fourth time period.

21. The method for controlling the touch screen display system according to claim 12, wherein the touch screen display system further comprises a host apparatus, and the at least two touch screen display apparatuses respectively comprise a first projection apparatus, and a second projection apparatus physically separated from the first projection apparatus, the host apparatus is configured so that a whole frame that is a combination of a main frame and an extending frame is to be displayed on the host apparatus, wherein the method further comprises:

projecting the main frame on the first touch screen by the first projection apparatus; and projecting the extending frame on the second touch screen by the second projection apparatus.

* * * * *